United States Patent
Bouix et al.

(10) Patent No.: US 8,403,008 B2
(45) Date of Patent: Mar. 26, 2013

(54) METERED DOSE APPLICATOR WITH LIGHT FOR ACTIVATING PRODUCT

(75) Inventors: Herve F. Bouix, New York, NY (US); Francis Corbellini, Thiais (FR)

(73) Assignee: ELC Management, LLC, New York, NY (US)

( * ) Notice: Subject to any disclaimer, the term of this patent is extended or adjusted under 35 U.S.C. 154(b) by 443 days.

(21) Appl. No.: 12/785,670

(22) Filed: May 24, 2010

(65) Prior Publication Data

US 2011/0284123 A1  Nov. 24, 2011

(51) Int. Cl.
*B65B 1/04* (2006.01)

(52) U.S. Cl. ........................... 141/27; 141/23

(58) Field of Classification Search ............ 141/18, 141/21, 23, 24, 26, 28, 322, 27
See application file for complete search history.

(56) References Cited

U.S. PATENT DOCUMENTS

| | | | | |
|---|---|---|---|---|
| 726,038 A | * | 4/1903 | Fitzsimmons | 141/24 |
| 899,015 A | * | 9/1908 | Fitzsimmons | 141/24 |
| 2,854,003 A | * | 9/1958 | Kirsch | 141/24 |
| 3,101,751 A | * | 8/1963 | Ballin | 141/24 |
| 4,376,591 A | * | 3/1983 | Proffer | 401/127 |
| 4,579,153 A | * | 4/1986 | Goncalves | 141/23 |
| 6,112,779 A | * | 9/2000 | Camilla | 141/23 |
| 6,840,291 B2 | * | 1/2005 | Caizza et al. | 141/25 |
| 7,837,069 B2 | * | 11/2010 | Kroub | 222/113 |
| 2007/0072146 A1 | * | 3/2007 | Pierson | 433/90 |

OTHER PUBLICATIONS

ISR and WO of the ISA for PCT/US2011/035839.

* cited by examiner

*Primary Examiner* — Gregory Huson
*Assistant Examiner* — Jason K Niesz
(74) *Attorney, Agent, or Firm* — Peter Giancana

(57) ABSTRACT

Metered dose applicators that irradiate a portion of light sensitive product. When a dropper applicator is secured to a reservoir, a usable volume inside the dropper is reduced. As the dropper is removed from the reservoir, the usable volume in the dropper increases, creating a suction within the dropper that draws product into the dropper from the reservoir. When the dropper is off the reservoir, then a button that is accessible to a user is used to increase and decrease the size of the usable volume. The button also turns on a light that is effective to activate the product as it is being dispensed from the dropper.

24 Claims, 5 Drawing Sheets

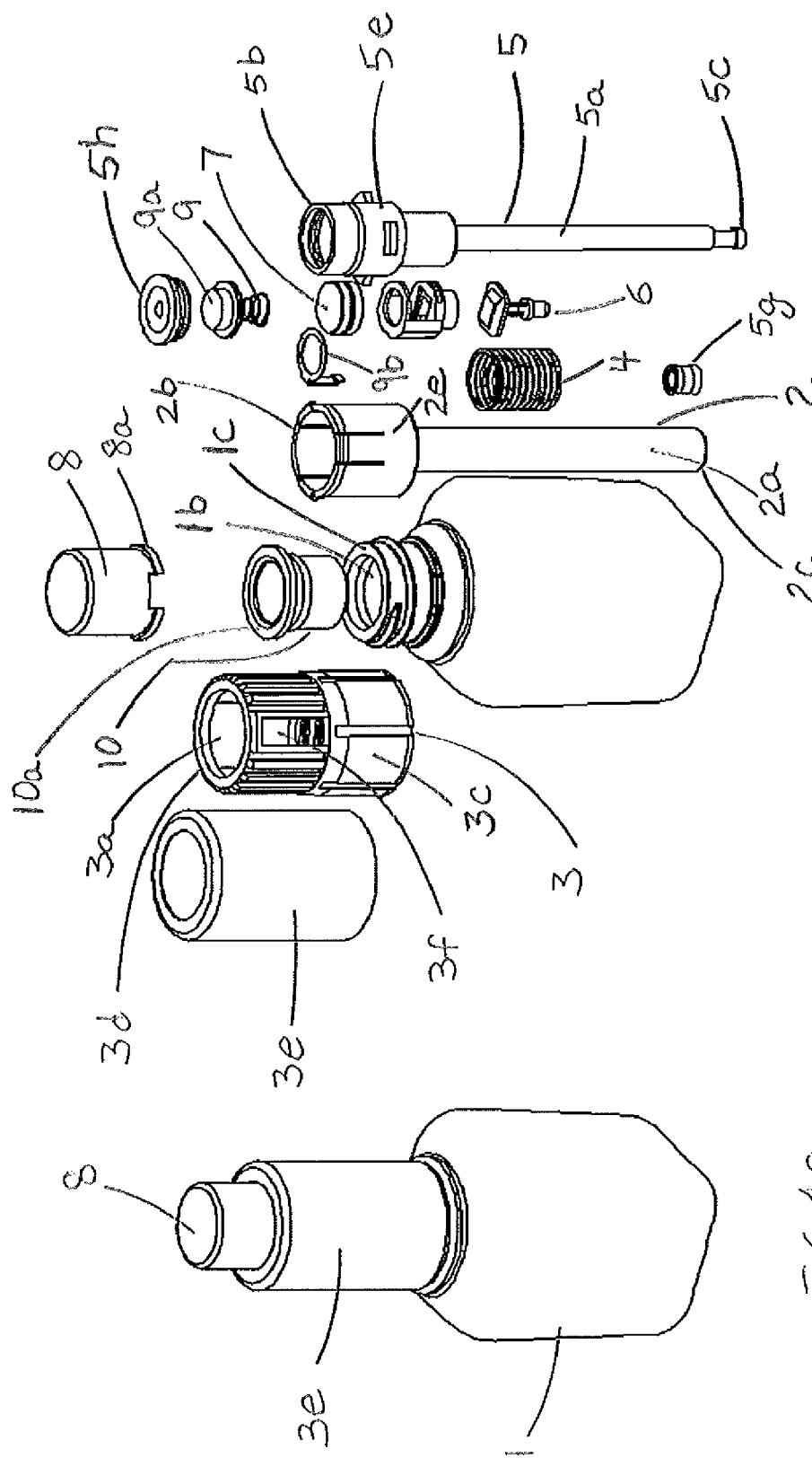

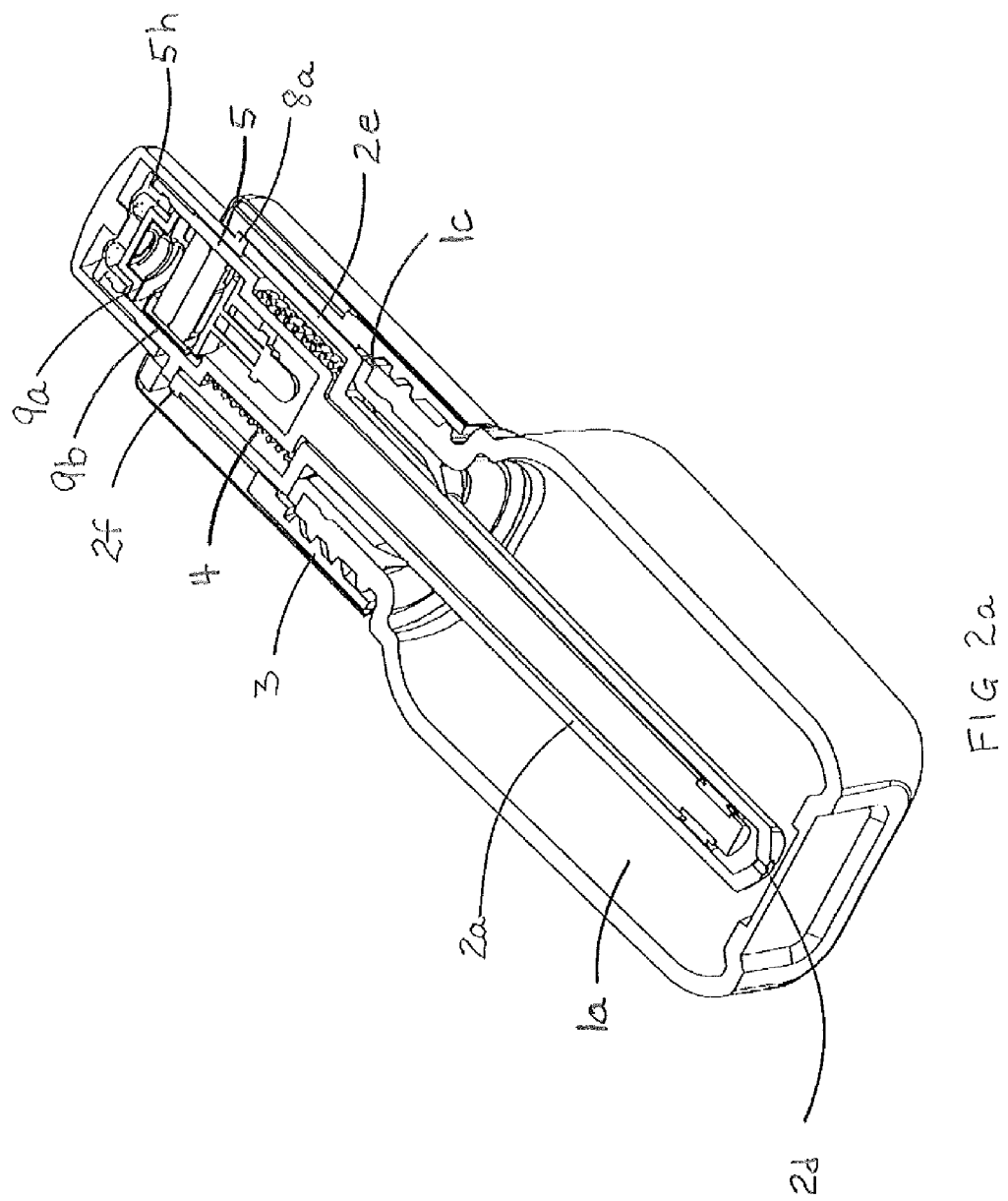

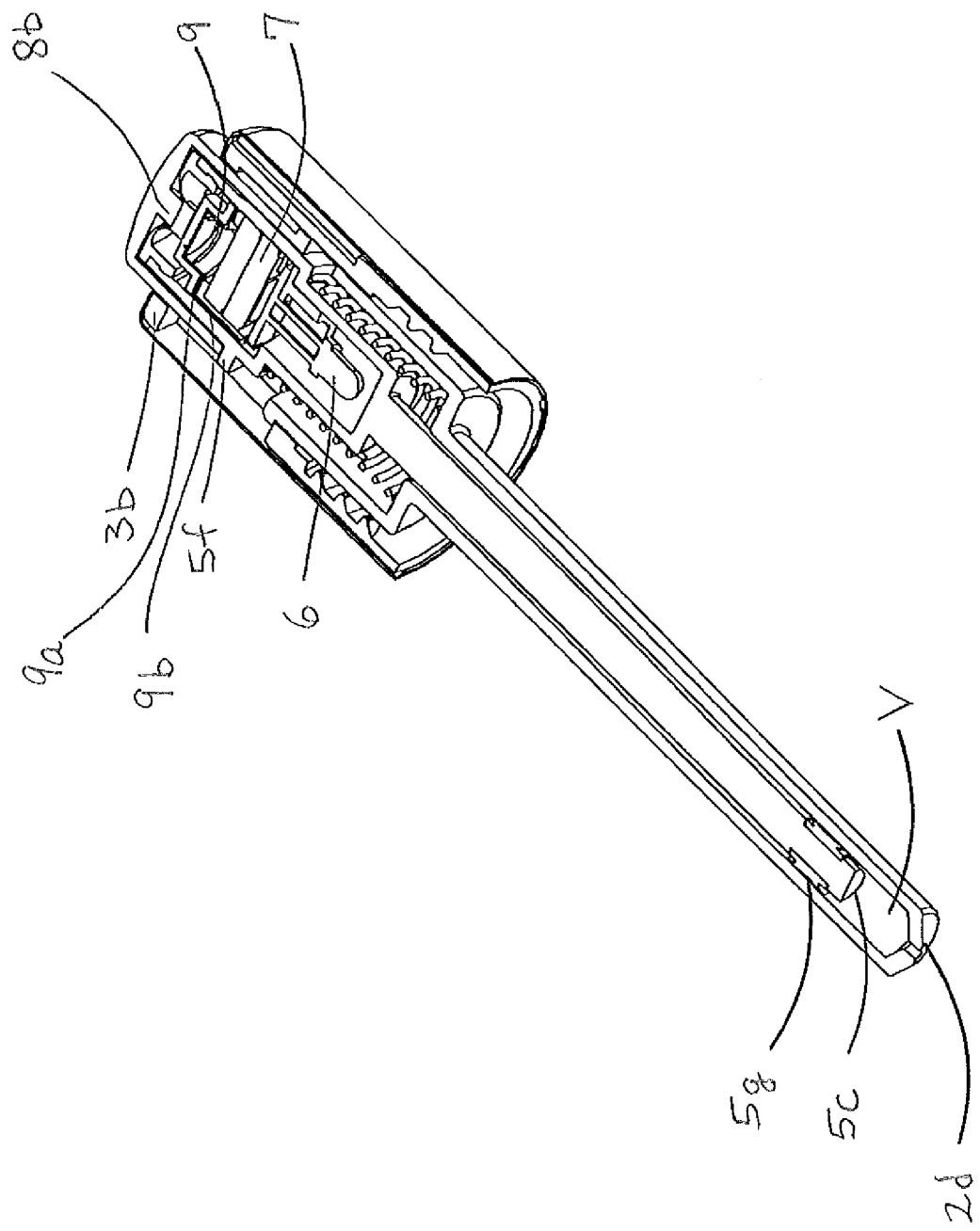

METERED DOSE APPLICATOR WITH LIGHT FOR ACTIVATING PRODUCT

FIELD OF THE INVENTION

The present invention pertains to product applicators that irradiate a portion of product as it is being dispensed from a dropper applicator.

BACKGROUND

Dropper applicators are well known. One common type may be an elongated cylindrical tube, opened at a first and a s second end. The first end is fitted with a flexible bulb or some type of bellows. In use, the second end is immersed in a fluid. When the bellows is expanded, fluid is drawn into the elongated cylinder through the second end. When the bellows is collapsed, fluid is ejected from the elongated cylinder thought the same end.

Treating products with light is known. Products are treated with light for various reasons. For example, it is known to treat water with light to kill germs. It is also known to use light to cure dental adhesives. Light has been used to initiate chemical reactions that may not occur in the absence of light. Light has been used a reagent or catalyst in many chemical and biological reactions.

SUMMARY

Embodiments of the present invention include a dropper applicator with a light for activating a product. When the applicator is secured to a reservoir, a inside the dropper is reduced. As the dropper is removed from the reservoir, the in the dropper increases, creating a suction within the dropper that draws product into the dropper from the reservoir. A light that is effective to activate the product is also provided. The applicator is configured to allow the light to activate product in the dropper. Optionally, the light may also activate product in the reservoir. In one embodiment, the light is turned on by a button that is accessible to a user, and the same button also discharges the product from the dropper. In another embodiment, the light can be turned on when the dropper is out of the reservoir, but not when the dropper is in the reservoir.

DESCRIPTIONS OF THE FIGURES

FIG. 1a is a perspective view of one embodiment of a metered dose applicator with light for activating a product.

FIG. 1b is an exploded view of one embodiment of a metered dose applicator with light for activating a product.

FIGS. 2a-2d are cross sectional views of one embodiment of a metered dose applicator with light for activating a product. Sequentially, they depict the use of the applicator.

FIG. 2a shows a dropper fully seated on a container.

FIG. 2b shows the dropper unseated from the container, but still immersed therein.

FIG. 2c shows the dropper out of the container and a button partially depressed enough to close a lighting circuit.

FIG. 2d shows the dropper out of the container and button further depressed to dispense product from the dropper.

DETAILED DESCRIPTION

Figure 2B:
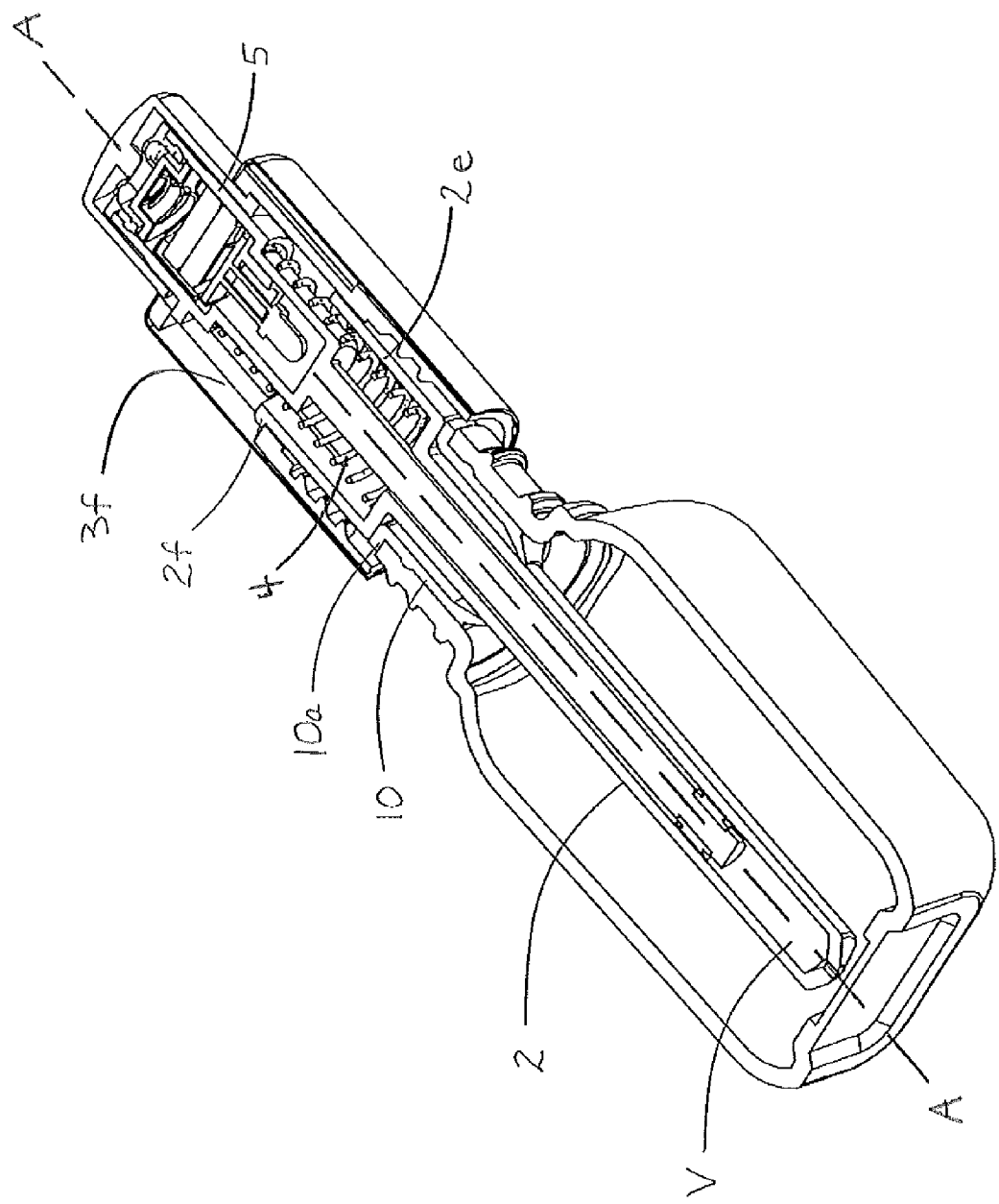

"Handheld applicator" means an applicator that is intended to be held in one or more hands and raised in the air, as the applicator is performing one or more main activities. Main activities include seating and unseating a dropper from a container, and supplying product from the dropper to an application surface. Thus, "handheld" means more than just being able to grasp an object. For example, a "space heater" does not meet this definition of handheld.

Throughout the specification "comprise" means that an element or group of elements is not automatically limited to those elements specifically recited, and may or may not include additional elements.

Throughout the specification, "proximal" means closer to or towards the top of the metered dose applicator, and "distal" means further from or away from the top of the metered dose applicator Throughout the specification, we speak of an "activated" product, which is one in which the light of the dropper applicator has "initiated" some change in a precursor product. See below, for a more detailed definition of "initiate".

In some embodiments, a metered dose applicator of the present invention comprises a container (1), a dropper (2), a closure (3), a first spring (4), a piston (5), an activating light (6), a power source (7), a push button (8), a manual on and off switch, and electrical connections between the power source, the light and the manual on and off switch.

The Container

The container (1) comprises a reservoir (1a) for holding a flowable product (not shown). For example, the flowable product may be a cosmetic product, a topically applied skin treatment product, a hair product, a nail product, a dental product, an eye product, or an ingestible product. Alternatively, the flowable product may not be intended for cosmetic or personal care treatment or ingestion. For example, the flowable product may be a light-curable adhesive.

The container has an opening (1b) that is circumscribed by a sealing surface (1c). The container opening permits access to the flowable product by a dropper (2). The container cooperates with a closure (3) that can be seated and unseated on the container, in normal use. For example, the container may have a threaded neck finish, or a bayonet-type finish or an interference mechanism that interacts with cooperating features on the closure. When the closure is seated on the container, the dropper is in the reservoir. When unseated the dropper may be removed from the reservoir. In general, the container may be any size and shape. Preferably, the container is deep enough to accommodate a maximum length of the dropper. The container may be made of any material suitable for containers, having regard to the type of products that they hold. For example, the container may comprise glass, plastic, metal, or paper. Portions of the container may be rigid, to a more or less degree, or flexible, to a more or less degree. In normal use, the container may retain its shape or the container may collapse as product is withdrawn from the reservoir. The container may be transparent, translucent or opaque. The qualities of transparency, translucency and opacity are defined with respect to particular wavelengths of light for a given material. For example, some glass is transparent to visible light, but opaque to most UV light. In some preferred embodiments the container is translucent or opaque, so as to inhibit ambient light from entering the product. The container may be clear or tinted. In some preferred embodiments the container is tinted. For example, the container may be have an amber, green or blue tint. Again, this may be to inhibit ambient light from entering the product.

Unlike many container-applicator systems, the container (1) of the present invention is necessary to realize the full functionality of the dropper applicator, in some embodiments. As may be seen below, the role of the container is more than just holding a product.

The Dropper

The dropper (2) is the part that takes up product from the reservoir (1a) and delivers it to an application surface. When the closure (3) is seated on the container (1), the dropper is in the reservoir. When the closure is unseated, the dropper may be removed from the reservoir. The dropper comprises an elongated portion (2a) having proximal end (2b), a distal end (2c) and a central longitudinal axis (A, shown in FIG. 2b). The elongated portion will be described, herein, as cylindrical, but this is not essential. The dropper is able to take up product from a reservoir when a suction or negative pressure is created inside the elongated cylindrical portion. The dropper must be sized to fit through the opening (1b) of the container (1). The elongated cylinder is hollow and opened at both ends. The opening at the distal end of the dropper is an orifice (2d), through which product flows into and out of the dropper. The orifice is sized to control the flow of product through the orifice. For example, a smaller orifice may ensure that the product does not emerge too fast from the dropper onto the application surface. A larger opening may ensure that a thicker or more viscous product can be efficiently received into the dropper, and efficiently dispensed from the dropper. For example, embodiments of the invention may include openings of 0.1-10.0 mm, 0.1-5.0 mm, 0.1-1.0 mm, 0.25-10.0 mm, 0.5-10.0 mm, and 1.0-10.0 mm.

The hollow interior of the dropper (2) may thought of as divided into sections. The space from the orifice (2d) of the dropper up to a certain level (to be defined below) is referred to as the usable volume (V) of the dropper. The usable volume is that part of the dropper that may be filled with product from the reservoir. Product from the reservoir (1a) flows into and out of this usable volume. Above the usable volume (i.e. closer to the proximal end (2b) of the dropper), another section of the dropper interior houses all or a portion of a suction and dispensing mechanism. To accommodate this, the proximal end of the dropper may include an enlarged cylindrical portion (2e), that is co-axial with the elongated cylindrical portion (2a). Generally, the enlarged cylindrical portion may be too large to fit through the opening (1b) of the container. In this case, the enlarged cylindrical portion may be used to form a seal against the sealing surface (1c) of the container opening (see FIG. 2a). To make the seal more effective, a gasket (10a) may intervene between the enlarged cylindrical portion and the sealing surface of the container opening. In practice, the gasket may be in the form of a flange located on a wiper (10) that is seated in the neck of the container (1). Generally, all or a portion of the enlarged cylindrical portion (2e) may reside inside the closure (3). In some embodiments, one or more stops (2f) protrude from the enlarged cylindrical portion.

The dropper (2) is capable of a sliding motion, along central longitudinal axis (A). This motion is described relative to the closure (3), which, for reference purposes, may be taken as stationary. Specifically, as the closure is being seated onto the container (1), a portion of the dropper (i.e. the enlarged cylindrical portion (2e)) comes to contact the container (or gasket (10a) as the case may be). Then, as the closure is further seated onto the container, the dropper is pushed upward, relative to the closure, against the action of a first spring (4), compressing the first spring. Likewise, as the closure is being unseated from the container, the dropper is pushed downward, relative to the closure, under the action of the first spring. The bottom of the first spring bears against the dropper, while the top of the first spring bears against the piston (5), which ultimately bears against the closure. In one embodiment, the outer diameter of the first spring is such that the spring fits into the enlarged cylindrical portion (2e) of the dropper.

In intended use, the only times that that the dropper (2) will move relative to the closure (3), are when the closure is being seated onto or unseated from the container (1). Thus, in intended use, a container is necessary to effect movement of the dropper relative to the closure. When the dropper is out of the container, one could move the dropper relative to the closure, by pushing the dropper upward toward the closure, but this does not describe intended or consumer use, since normally, the dropper will be covered with product, and there is no practical reason for a consumer to do this.

The dropper (2) may be made of any suitable material, including plastic or glass. The dropper may be transparent, but various embodiments of the invention include a dropper that controls the passage of ambient light through the wall of the dropper. Ambient light refers to any light not generated by the dropper applicator of the present invention. To control the passage of ambient light through the wall of the dropper and into the precursor product in the dropper, the dropper wall may be capable of absorbing, attenuating, filtering, reflecting, scattering and/or refracting light. For example, the inner or outer surfaces of the dropper may be coated with a material that provides one or more of these capabilities. For example, to prevent some amount of ambient light, or all ambient light from entering the precursor product in the dropper, the outside of the dropper may be covered with a light absorbing material, such as black paint or other opaque coating, or the dropper may be fashioned of a pigmented material. Alternatively, the outside of the dropper maybe covered with a light reflecting material, like a shiny foil or curable silver coating. Alternatively, if it is important to block the passage of some wavelengths of light, while allowing others to enter the dropper, a light filtering material may be used, either on the inside surface or outside surface of the dropper, or the dropper may be fashioned of a material that selectively transmits light. A filter might, for example, allow ambient infrared light to enter the dropper, while blocking UV light. In some embodiments of the present invention, substantially all ambient light is prevented from passing through the dropper wall, into the precursor product (i.e. the dropper is opaque, either through a surface coating or being fashioned of a pigmented material, etc.)

The Piston

The piston (5) may be thought of as comprising first and second portions. For example, a first portion may be an elongated portion (5a) (described herein as cylindrical, but this is not always necessary) having proximal end (5b), and a distal end (5c). In the final assembly, the elongated portion is coaxial with central longitudinal axis (A). The proximal end of the piston may include a second portion, formed, for example, as an enlarged cylindrical portion (5e), that is co-axial with the elongated cylindrical portion (5a). Generally, the elongated cylindrical portion may be solid or hollow, but the enlarged cylindrical portion of the piston is hollow to house various components of a lighting circuit. The piston must be sized to fit inside the dropper (2). For example, the elongated cylindrical portion (5a) of the piston fits inside the elongated cylindrical portion (2a) of the dropper, and the enlarged cylindrical portion (5e) of the piston fits inside the enlarged cylindrical portion (2e) of the dropper. The fit between the piston and dropper is such that the piston can slide up and down relative to the dropper. When the piston is in its bottom-most position relative to the dropper (FIG. 2a), then a maximum amount of the enlarged cylindrical portion of the piston may be inside the enlarged cylindrical portion of the dropper. When the piston is in its upmost position relative to the dropper (FIG. 2b), then a maximum amount of the enlarged cylindrical portion of the piston may be outside the enlarged cylindrical portion of the dropper.

As noted, the enlarged cylindrical portion (5e) of the piston (5) is hollow to house various components of a lighting circuit. The proximal end of the enlarged cylindrical portion is opened to allow access to the hollow interior. In final assembly, the proximal end may be closed off by a cap (5h), that attaches securely, but perhaps removably, to the enlarged cylindrical portion, i.e. via screw threads or snap fit. In some embodiments, a section of the enlarged cylindrical portion protrudes out of an upper opening (3a) of the closure (3), such that a user can engage the piston in normal use, to move the piston up and down. To that end, a button (8) is provided, which the user pushes and releases, to lower and raise the piston, relative to the dropper (see FIG. 2c).

As they move relative to each other, the dropper (2) and piston (5) are urged by or urged against the first spring (4), which compresses an elongates in the process. The bottom of the first spring bears against the dropper, while the top of the first spring bears against the piston (5). In one embodiment, the outer diameter of the first spring is such that the spring fits into the enlarged cylindrical portion (2e) of the dropper, while the inner diameter of the first spring is such that the spring fits loosely around the piston. In some embodiments, the length of the first spring when compressed, is such that all or most of the first spring fits into the enlarged cylindrical portion of the dropper (see FIG. 2a). In some embodiments, the length of the first spring when elongated is sufficient to displace the dropper to the bottom of its travel (see FIG. 2b). For example, in some embodiments the first spring extends until one or more stops (2f) of the dropper come to bear against the lower bounds of one or more slots (3f) of the closure.

As noted, the elongated cylindrical portion (5a) of the piston (5) fits inside the elongated cylindrical portion (2a) of the dropper (2). While the piston can slide inside the dropper, a water tight seal is provided between a portion of the dropper and a portion of the piston (i.e. between a portion of the elongated cylindrical portions (2a, 5a)). For example, an elastic or rubber sealing ring (5g) is positioned on the piston, near the distal end (5c) of the piston (see, for example, FIG. 2d). The sealing ring slides up and down with the piston, while maintaining water tight contact with the inner wall of the elongated cylindrical portion of the dropper. Thus, as product is drawn into the dropper from the reservoir (1a), and urged out of the dropper through the orifice (2d), the product remains below the level of the sealing ring. This prevents the product from moving up the sides of the piston and bypassing the piston. Thus, the sealing ring ensures that the dropper will be efficiently evacuated.

As just described, product from the reservoir may fill the dropper (2), up to the level of the sealing ring (5g). The space from the orifice (2d) of the dropper up to the level of the sealing ring is referred to as the usable volume (V) of the dropper. Product from the reservoir (1a) flows into and out of this usable volume. As the dropper and piston (5) slide relative to each other, the size of the usable volume changes. The usable volume is at its maximum when the dropper is out of the bottle (or, at least, unseated from the bottle) and the first spring (4) is at its maximum extension (as in FIG. 2b). The usable volume is at its minimum when the first spring is at its minimum extent (as in FIG. 2a). Preferably, the minimum usable volume is as close to zero as possible. When this is the case, all or most of the product can be dispensed from the dropper. The difference between the maximum and minimum usable volumes is the maximum product dose. Thus, the maximum product dose depends on the length of travel of the sealing ring relative to the dropper, and on the inner diameter of the dropper. It also depends on the geometry of any portion of the dropper that is not cylindrical. For example, in the figures, the distal end (2c) of the dropper, is shown as tapered. Any of these parameters can be manipulated to adjust the maximum product dose. In various embodiments, the maximum dose of product may be at least 0.1 mL, or at least 0.5 mL, or at least 1.0 mL, or at least 5 mL, or at least 10 mL, as the situation dictates. For example, various applicators according to the present invention may be capable o delivering 0.1-5 mL, 0.1-10 mL, 0.5-5 mL, 0.5-10 mL, 1.0-5 mL, 1.0-10 mL, or 5-10 mL. Any of these may be more appropriate depending on the product. Some of these ranges may be less or not appropriate, depending on the product. Of course, an actual dose of product may be less than the maximum dose. For example, a user may remove the dropper from the reservoir before the usable volume is completely filled with product. Or, a user may not cause the piston to travel its full distance.

It has been noted that, in some embodiments, product in the dropper (2) remains below the level of the sealing ring (5g). This prevents the product from moving up the sides of the piston (5). On the other hand, it has been noted that the lighting circuit, including one or more light sources (6), is housed in the enlarged cylindrical portion (5e) of the piston. Thus, if the elongated cylindrical portion (5a), as so far described, would inhibit the passage of light, then light from the light source may not reach the precursor product in the dropper. Therefore, a means of transmitting the light from the light source to the precursor product in the dropper must be provided. In one embodiment, the elongated cylindrical portion of the piston may have a channel through it to permit the passage of light. If this is done, then it may be necessary to provide a window near the distal end of the channel, so that precursor product cannot travel up the piston, but light can still reach the precursor product. In another embodiment, the channel through the elongated cylindrical portion of the piston may comprise a wave guide, such as a fiber optic cable that directs the light from the light source to the precursor product in the dropper. In still another embodiment, the elongated cylindrical portion of the piston is solid, but transparent or translucent to a degree that allows the passage of an amount of a specific wavelength (i.e. a peak wavelength) of light, the amount being sufficient to activate all or a portion of a dose of precursor product. For example, the elongated cylindrical portion may be a transparent material, such as clear vinyl, clear polyethylene terephthalate, styrene, lucite, glass, poly (methyl methacrylate), fiberglass, polycarbonates, etc., that passes over 90% (better 95%, better still 98%) of the specific or peak wavelength of light that shines on it.

The Closure

The closure (3) serves as a handle for the dropper (2), and aids in sealing and unsealing the reservoir (1a) of the container (1). The closure may be seated and unseated on the container (1), by any of various means. For example, the container may have a threaded neck finish, or a bayonet-type finish or an interference mechanism that interacts with cooperating features on the closure. In normal use, the closure provides access to the dropper. When the closure is seated on the container, the enlarged cylindrical portion (2e) bears down on the sealing surface (1c) of the container opening (1b). When unseated, the enlarged cylindrical portion does not bear down on the sealing surface of the container opening (although it may be resting thereon), and the dropper may be removed from the reservoir.

The closure (3) houses upper portions of the dropper (2) and piston (5). In some embodiments, the closure comprises upper (3c) and lower (3d) cylindrical portions. The wall of the lower portion may be solid, and the means for seating the closure on the container may be located on the inside of this wall. For example, threads may project from the inside of the wall of the lower cylindrical portion.

When the closure (3) is being seated on or unseated from the container (1), the dropper (2) slides upward or downward, respectively, along the central longitudinal axis (A, see FIG. 2b)), relative to the closure, which, for reference purposes, may be taken as stationary. In some embodiments, the wall of upper cylindrical portion (3c) has one or more slots (3f), that are bounded above and below. The one or more stops (2f) of the dropper slide up and down in these slots. In some embodiments, slots may be used to limit the upward and/or downward travel of the dropper. For example, FIG. 2b compared to FIG. 2a shows the downward movement of the dropper, relative to the closure. Moving downward, the one or more stops of the dropper come to bear against the lower bounds of the one or more slots of the closure (see FIG. 2b). In some embodiments, the upward travel of the dropper may be limited by the upper bound of the slot. In other embodiments, the upward travel of the dropper may be limited by portions of the piston (as shown in FIG. 2a).

Figure 2C:
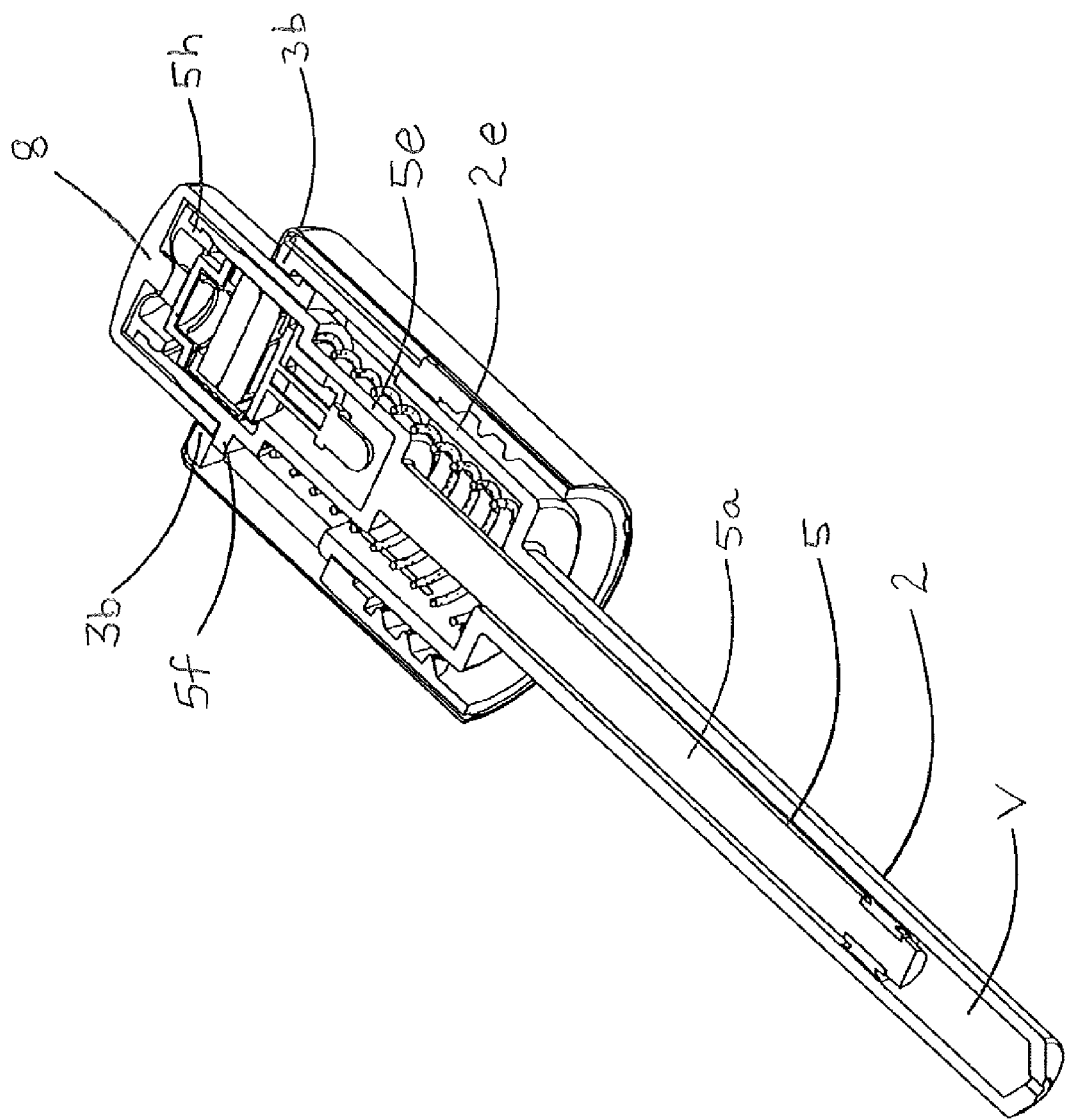

The top of the closure has an upper opening (3a) that is coaxial with central longitudinal axis (A). This upper opening is circumscribed by a return (3b). The upper opening provides access to the piston (5). For example, in some embodiments of the present invention, a section of the piston protrudes out of the upper opening, such that a user can engage the piston in normal use. At different stages of use of the present invention, the piston slides back and forth along the central longitudinal axis (A), relative to the closure, which, for reference purposes, may be taken as stationary. FIG. 2d, relative to FIG. 2c, shows one embodiment of the downward movement of the piston, relative to the closure. The return (3b) of the upper opening (3a) may be used to define the upper limit of travel of the piston. For example, the stop (5f) of the piston may come to bear against the return of the upper opening. The lower limit of piston travel may or may not have a hard stop. An example of a hard stop would be when the stop of the piston comes to bear against the top of the dropper (2). A hard stop may not be needed if a user can push the piston only so far.

The closure (3) may be made of any suitable material, including plastic or metal. An overshell (3e) that surrounds the exterior of the closure may be provided, for aesthetic or other reasons.

Dispensing Product

When opening the container (1), the dropper (2) travels downward relative to closure (3) and piston (5), and the usable volume (V) in the dropper expands. This creates a suction or negative pressure in the dropper, which draws product from the reservoir (1a) into the dropper. Then, when the button (8) is pushed, the piston travels downward relative to the closure and dropper, and the usable volume shrinks. This pushes product out of the dropper. If a user wants more product, he/she does not need to reseat the closure on the container. Rather, he/she should insert the dropper into the product in the reservoir, and release (or push and then release) the button. When the button is released, the piston now moves upward relative to the closure and dropper. This, again, creates a suction in the dropper, which draws product from the reservoir into the dropper. When the button is pushed again, the usable volume shrinks and product is again dispensed from the dropper. When finished, the user seats the closure on the container. As this is done, the dropper travels upward relative to the closure and piston, and the usable volume shrinks. If there was any product in the dropper, it may be ejected into the reservoir. Because the closure is secured to the container, the dropper remains in the upmost position relative to the closure, and ready for the next use. Furthermore, with the closure seated on the container, and the dropper in its upmost position, the button cannot be depressed, because the button is bearing down on the dropper, which is bearing down on the container (see FIG. 2a). Thus, product in the reservoir cannot be churned again and again, for no reason, and possibly to the detriment of the product.

The Lighting Circuit

Described so far, are embodiments of a dropper applicator whose parts exhibit two different relative motions. In the first instance, when opening and closing the container (1), the dropper (2) travels relative to the closure (3) and the piston (5), while the closure and the piston are stationary relative to each other. In the second instance, when button (8) is pushed and released, the piston travels relative to the closure and dropper, while the closure and dropper are stationary relative to each other. Also, when the closure is fully seated on the reservoir, none of the closure, dropper or piston can move relative to each other. These embodiments are now extended to have a lighting circuit that activates a precursor product only as the precursor product is being dispensed from the dropper, so as to preserve, in an inactivated state, the precursor product in the reservoir.

In some embodiments of the present invention, the enlarged cylindrical portion (5e) of the piston (5) is hollow, and houses various components of the lighting circuit. The lighting circuit comprises one or more sources of light, a power source, an on and off switch, and connections between the light source(s), the power source and the switch. For example, in the embodiments of FIGS. 2a-2d, a light source (6) and two batteries (7) are located in the enlarged cylindrical portion of the piston. When the switch is closed, power flows to the light source. When the switch is open, power cannot flow to the light source. The connections may be electrical conductors, such as low voltage wiring, and metallic leads or terminals to and from the light source, the power source and the switch.

In one embodiment, a useful switch loop circuit comprises a power source (7) and an on and off switch. In this embodiment, the on and off switch comprises the button (8), a second spring (9) which is electrically conducting, and first and second electrical leads (9a, 9b). The power source has positive and negative terminals. The positive terminal may be connected to a first lead of the light source (6). The negative terminal may connected to a first end of second spring (9). A second end of the second spring contacts (or is integrally formed with) the first electrical lead. The second electrical lead leads to the light source. The first and second electrical leads are able to make and break electrical contact by the action of the button (8) and second spring. For example, FIG. 2a shows these leads electrically separated, while FIG. 2d shows them in contact. To accomplish this, the button has a downwardly protruding portion (8b) which can pass through an opening in the cap (5h). When the button is depressed, the downwardly protruding portion of the button displaces the first electrical lead (9a), compressing the second spring, and allowing the first electrical lead to make contact with the second electrical lead (9b) that leads to the light source, thus closing the circuit. When the button is released, the second spring urges the button upward and the first electrical lead breaks contact with the second electrical lead, thus opening the circuit.

Previously, the button (8) was described as used for lowering and raising the piston relative to the dropper (2), in cooperation with the first spring (4). Now, the button takes on a second role, as part of the on and off switch for the lighting circuit. The button thus described, operates to compress both the first spring and second spring. In preferred embodiments, the first spring is compressed only after the lighting circuit is closed. For example, if the first spring is substantially stiffer than a second spring, then the initial downward travel of the button will compress the second spring, but not the first. Thus, the lighting circuit may be closed, without the piston having been displaced. At the point that the lighting circuit is closed, the light shines and is conveyed through the elongated cylindrical portion (5a) of the piston, into the precursor product located in the usable volume (V) of the dropper. Then, as the button travels further downward, the force on the first spring increases, and eventually causes the first spring to compress, and the piston to be displaced. As a result, the usable volume shrinks, and product is dispensed from the dropper. When a user reduces pressure on the button, the piston rises relative to the dropper, under the action of the first spring. As a result, the usable volume increases, creating a negative pressure in the usable volume and drawing either product from the reservoir, or air into the dropper. As the button rises further, the second spring elongates and the electrical contact between leads (9a) and (9b) is broken, thus opening the lighting circuit.

Thus, there are two distinct phases of downward travel of the button (8). In phase one, the travel of the button causes the lighting circuit to close. In phase two, the downward travel of the button causes the piston (5) to eject activated product from the dropper (2). Preferably, no product is ejected from the dropper during phase 1 of the button travel. This may ensure that the precursor product in the dropper receives as adequate amount of light treatment before being ejected from the dropper.

Furthermore, it is possible to configure the button (8) so that, when the closure (3) is seated on the container (1), the button cannot be depressed. For example, in FIG. 2a, the closure is seated on the container, and stop (8a) of the button is already contacting the top of the dropper, which cannot move because it is bearing down on the container. In this arrangement, it is not possible to push the button to turn on the light source, thus maintaining the product in the reservoir in an inactivated state.

The power source (7) has been described as one or more batteries. Preferably, the power source can provide sufficient power to drive the light source (6), at least until the product in the container (1) is used up. Many types of battery may be prove useful, depending on the amount of product in the reservoir and on the type of light source used. Examples of battery types that may be considered include: zinc-carbon (or standard carbon), alkaline, lithium, nickel-cadmium (rechargeable), nickel-metal hydride (rechargeable), lithium-ion, zinc-air, zinc-mercury oxide and silver-zinc chemistries. Common household batteries, such as those used in flashlights and smoke detectors, are frequently found in small handheld devices. These typically include what are known as AA, AAA, C, D and 9-volt batteries. Other batteries that may be appropriate are those commonly found in hearing aides and wrist watches. In some preferred embodiments, the batteries do not contain heavy metals, for environmental and health reasons. In various embodiments, the power source is capable of providing actual (not nominal) voltages of 1 to 9 volts of electricity, over the lifetime of the container. For example, when the button (8) is depressed, the power source in the dropper applicator provides a voltage between 1 and 3 volts, or between 1 and 6 volts, or between 1 and 9 volts, or between 3 and 6 volts, or between 3 and 9 volts, or between 6 and 9 volts of electricity.

In one or more embodiments, the battery(ies) can be removed from the dropper applicator, either for replacement or for separate disposal as may be required by local ordinances. "Removable" means that the applicator provides easy access to the batteries. Thus, damaging the applicator to get at the batteries does not meet the definition of removable. In these embodiments, it may be necessary to design the button (8) so that it can be removed from the opening (3a) of the closure (3). Then, if the cap (5h) of the piston (5) is also removable, a user has access to the interior of the enlarged cylindrical portion (5e) of the piston to remove the batteries.

The light source (6) is capable of emitting light at a specified wavelength, or range of wavelengths that are effective to activate a precursor product located in the dropper (2). In initiating a change or reaction in the precursor product in the dropper, directional intensity must also be considered. If the light is too dim along the central longitudinal axis (A) of the dropper in the distal direction, then the cross section for reaction may be too small to affect any substantial change in the precursor product, especially considering the length of time that the precursor product is exposed to the dropper's light. In normal use, the light source is expected to be on for one second or less, as a user depresses and releases the button (8). Therefore, the intensity of the light at the specified wavelength should be sufficient to activate all or a substantial portion of the precursor product located in the dropper, during that one second or less. The amount of light that reaches the precursor product may be adjusted by using a brighter light source, and/or by directing the light from the light source to reach the precursor product. For example, as discussed above, in one embodiment, a channel through the elongated cylindrical portion (5a) of the piston (5) may comprise a wave guide, such as a fiber optic cable that directs the light from the light source to the precursor product in the dropper.

In another embodiment, the light source itself, may be designed to emit light in defined angular pattern, such that the amount of light reaching the precursor product in the dropper is sufficient to activate all or a portion of a dose of precursor product. In some embodiments, at least 25% of the light source's power output is directed toward the precursor product in the usable volume, into a cone whose central axis coincides with the longitudinal axis (A) of the dropper. More preferred is at least 50% of the light source's power output, and more preferred still is at least 75% of the light source's power output. In various embodiments, the apex of the cone has an angle of 15° to 90°. For example, 60° to 90° or 30° to 90°. In one useful embodiment, 50%-60% of the light sources power output is directed into cone with an apex of 15° to 60°; more preferably 15° to 30°. Light emitting diodes that are designed to radiate a significant portion of their output energy into a defined angular cone may be suitable for this purpose.

In useful embodiments involving skin and hair care products, the light may be infrared, visible, ultraviolet or combinations of these. Infrared light may be subdivided into bands. Depending on the classification scheme, and there are several, near infrared includes about 750 nm to about 1,400 nm; short wavelength infrared includes about 1,400 nm to about 3,000 nm; middle wavelength infrared includes about 3,000 nm to about 8,000 nm; long wavelength infrared includes about 8,000 nm to about 15,000 nm, and far infrared includes about 15,000 nm to about 1,000,000 nm. Humans, at normal body temperature, radiate most strongly in the middle infrared, at a wavelength of about 10,000 nm. Visible light covers about 390 nm to about 750 nm. Ultraviolet light includes about 10 nm to about 390 nm, but most ambient UV light is UVA (390 nm-315 nm), while some UVB (315-280 nm) and UVC (280-100 nm) are also present. Each may have different implications in chemical reactions, and not all of these may be safe or feasible to incorporate into a handheld personal care dropper applicator. Nevertheless, all of these types of light are found in the ambient atmosphere, which is why in some preferred embodiments of the present invention the container (1) and/or elongated cylinder (2a) are opaque or tinted. Ambient light is prevented from reaching the precursor product in the reservoir and/or dropper, where it might have caused an adverse reaction in the light sensitive product. With an opaque container and dropper, the precursor product does not undergo a change or reaction until a user turns on the dropper light.

In one useful embodiment, 50%-60% of the light sources power output is directed into cone with an apex of 15° to 60°; more preferably 15° to 30°, and the peak wavelength of light is between 315 nm and 1400 nm, for example, between 350 nm and 450 nm. In another useful embodiment, 50%-60% of the light sources power output is directed into cone with an apex of 15° to 60°; more preferably 15° to 30°, and the peak wavelength of light is between 390 nm and 1,400 nm, for example, between 700 nm and 1,400 nm. In still other useful embodiments, 50%-60% of the light sources power output is directed into cone with an apex of 15° to 60°; more preferably 15° to 30°, and the peak wavelength of light is in the visible red (620-750 nm) or visible yellow (570-590 nm) or visible green (495-570 nm) or visible blue (450-495 nm) band.

The Light Sensitive Product

As noted, the container (1) comprises a reservoir (1a) for holding a flowable product (not shown). The flowable product may be an end use product or it may be a precursor to an end use product. For example, the flowable product may be a cosmetic product, a topically applied skin treatment product, a hair product, a nail product, a dental product, an eye product, or an ingestible product. Alternatively, the flowable product may not be intended for cosmetic or personal care treatment or ingestion. For example, the flowable product may be an adhesive.

In preferred embodiments, the light supplied by the dropper applicator initiates one or more physical and/or chemical changes in all or a portion of a precursor product located in the elongated cylinder (2a). That is, the precursor product is light sensitive. For example, the light may initiate a reaction that alters the precursor product to have a property that it did not have before the reaction. Or, for example, the light may initiate a reaction that alters the precursor product to have a property to more or less of a degree, than it had before the reaction. The change in the precursor product may occur at the molecular or atomic levels. The precursor product may undergo a chemical reaction. For example, the reaction may be: endothermic, exothermic, pH neutralizing, an acid-base reaction, a curing reaction, softening, vaporizing, polymerizing, oxidizing, reducing, an ion forming reaction, organic, inorganic, or a photodecomposition reaction. In particularly useful embodiments of the present invention, the reaction may be oxidizing, reducing, endothermic, exothermic, or combinations thereof, to result in an end use product intended for application to skin or hair.

As noted, the light supplied by the dropper applicator may initiate one or more physical and/or chemical changes in all or a portion of a precursor product located in the elongated cylinder. The word "initiate" includes any situation in which a rate at which a precursor product changes on the molecular level is altered by the light of the dropper applicator. This may mean that a change is already occurring in the precursor product, before the light is supplied, but the rate at which the change is occurring is altered (either increased or decreased) by the light. Or, it may mean that a particular change is not occurring at all, until the light is supplied. In some cases, "initiate" will mean that the light supplied by the dropper applicator is sufficient to overcome some threshold energy for a reaction to proceed. In other cases, "initiate" will mean that the light supplied by the dropper applicator increases some threshold energy, so that some reaction is less likely to occur. In some embodiments, "initiate" may mean that the light supplied by the dropper causes a change in only one portion of the precursor product, but thereafter, the reaction spreads to other portions of the precursor product in the elongated cylinder (2a), even in the absence of the light. In other embodiments, a portion of precursor product can only undergo a change in the presence of the light.

In those embodiments of the dropper applicator that include more than one kind of light, a precursor product may undergo one or more different reactions associated with each kind of light. In some embodiments, the different kinds of light may be supplied simultaneously. In other embodiments, the different kinds of light may be supplied in a predetermined succession, thus controlling the order of the changes that the precursor product undergoes.

In other useful embodiments, the light supplied by the dropper applicator initiates one or more changes to components that are not, strictly speaking, part of the flowable product. For example, the light may kill microbes in all or a portion of the product that is located in the elongated cylinder (2a). In one embodiment, the light source is strong in the 250-270 nm range. In another embodiment, the light source is strong in the 355-375 nm range. Microbes may include, for example, bacteria, viruses, fungi, archaea, protists, green algae, plankton and planarian. Alternatively, the light may promote the growth of one or more kinds of microbes in the product, if that is desired.

Particularly interesting are reactions that split a carrier molecule in the precursor product, so that the carrier molecules release a second molecule that has some cosmetic or personal care benefit, especially a benefit for the skin or hair. Examples of this follow.

EXAMPLES

One embodiment of the invention takes advantage of the photochemical properties of benzoin (CAS 119-53-9). Benzoin is a photoinitiator that consists of an ethylene bridge flanked by phenyl groups and with hydroxyl and ketone functional groups. When exposed to UV, and visible radiation, benzoin undergoes structural changes. This property allows benzoin to be used as carrier molecule. For example, Solarbre, Inc. (Portland, Oreg., US) has created molecules, which allow the delivery of actives, released from benzoin by the action of sunlight. Two examples of this are shown in examples 1 and 2.

Example 1

A Benzoin Molecule Releases DHA Under UV Radiation

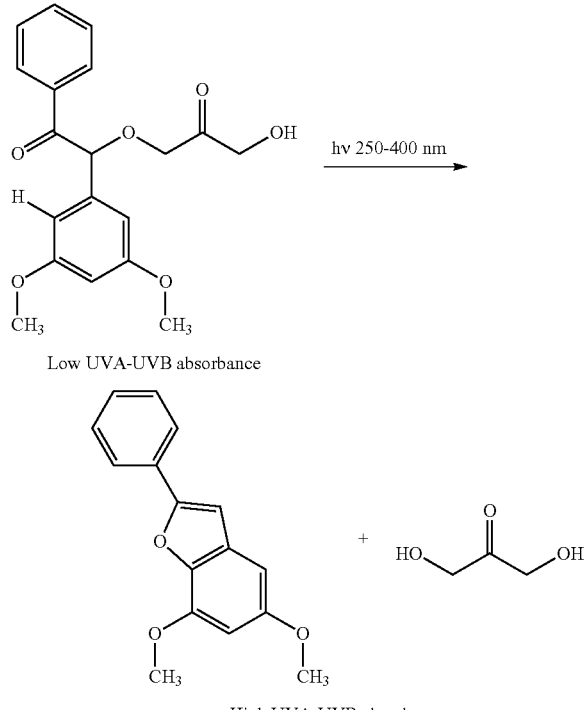

Example 2

A Benzoin Molecule Releases Vitamin C Under UVA Radiation

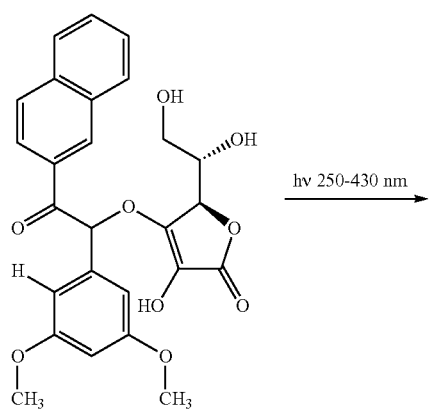

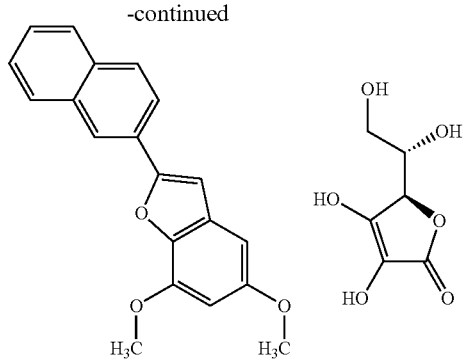

Example 3

A Benzoin Molecule Releases Vitamin C Under LED Light

It remained to be seen if useful results could be achieved with benzoin, in the absence of sunlight and other ambient light, using a light source controlled by a user at the time of application. Using a dropper applicator according to the present invention, the precursor molecule of example 2 was irradiated with an LED. The LED had a forward voltage of 3.0 to 3.8 volts, a typical emitting power of 10 mW±15%, where 50% of the emitted power was projected into an angular cone of 30° or 60°, and a peak wavelength in the upper UVA—violet end of the visible spectrum (i.e. from 385 nm to 410 nm). The LED was powered by two, nominally rated, 3 volt batteries. Carrier molecules were prepared in a 50/50 water-ethanol solution, at a 3.4% concentration. Also, carrier molecules were prepared in a lotion, at a 5% concentration. Following exposure to LED light, detectable amounts of free vitamin C were found in the product.

Benzoin is a photoinitiator. A photoinitiator is any chemical compound that decomposes into free radicals when exposed to light. Other photoinitiators may be useful in a precursor product when used with a dropper applicator according to the present invention. Peroxides (i.e. benzoyl peroxide), azo-compounds and nitrogen dioxide are examples of photoinitiators that may be useful in preparing precursor products that are useful with a dropper applicator according to the present invention. Azo compounds are compounds bearing the functional group R—N=N—R', in which R and R' can be either aryl or alkyl. It may be useful to use a combination of different light sensitive molecules in a precursor product, such as, a combination of different photoinitiators.

What is claimed is:

1. A metered dose applicator comprising:
   a container for holding a flowable product;
   a closure that can be seated and unseated from the container;
   a dropper having a central longitudinal axis and a usable volume, wherein the dropper slides along the central longitudinal axis relative to the closure when the closure is being seated or unseated from the container;
   wherein a negative pressure is created in the dropper as the closure is being unseated from the container.

2. The applicator of claim 1 further comprising:
   a flowable product in the container, wherein a portion of the flowable product is drawn into the usable volume of the dropper as a result of the negative pressure in the dropper; and a light source that is able to shine on the portion of flowable product when the portion of flowable product is in the usable volume.

3. The applicator of claim 1 wherein the size of the usable volume can change.

4. The applicator of claim 3 wherein the size of the usable volume increases as the closure is being unseated from the container, and decreases as the closure is being seated onto the container.

5. The applicator of claim 3 further comprising:
a piston that fits inside the dropper, such that:
the piston and dropper can slide up and down relative to each other;
a water tight seal is provided between a portion of the dropper and a portion of the piston; and
a first spring that compresses and elongates as the piston and dropper slide relative to each other.

6. The applicator of claim 5 wherein the size of the usable volume increases as the piston slides up relative to the dropper, and decreases as the piston slides down relative to the dropper.

7. The applicator of claim 6 further comprising:
a flowable product in the container, wherein a portion of the flowable product is drawn into the usable volume of the dropper as the piston slides up relative to the dropper, and a dose of flowable product flows out of the usable volume as the piston slides down relative to the dropper; and
a light source that is able to shine on the portion of flowable product when the portion of flowable product is in the usable volume.

8. The applicator of claim 7 where in the size of the dose is between 0.1 mL and 10 mL.

9. The applicator of claim 7 wherein the light source is housed in a portion of the piston, and the piston is transparent or translucent to a specific wavelength of light emitted by the light source.

10. The applicator of claim 9 further comprising:
a power source;
an on and off switch; and
electrical connections between the light source, the power source and the switch, such that when the switch is closed, power flows from the power source to the light source and when the switch is open, power does not flow from the power source to the light source.

11. The applicator of claim 10 further comprising a button accessible by a user, that is able to close and open the on and off switch in cooperation with a second spring, and that is able to lower and raise the piston relative to the dropper, in cooperation with the first spring, wherein the piston is lowered only after the on and off switch is closed.

12. The applicator of clam 10 wherein the power source is one or more batteries housed in the piston, and the batteries are removable or replaceable.

13. The applicator of claim 10 wherein the light source is one or more light emitting diodes having a peak wavelength and a power output, wherein at least 25% of the power output of the one or more light emitting diodes is directed into cone whose central axis coincides with the longitudinal axis of the dropper, the cone having an apex angle of 15° to 90°.

14. The applicator of claim 13 wherein 50%-60% of the power output is directed into cone with an apex of 15° to 30°, and the peak wavelength of light is between 315 nm and 1400 nm.

15. A dropper applicator according to claim 1 wherein the container contains a light sensitive product that can be activated by a light source that emits a specified wavelength of light.

16. The dropper applicator according to claim 15 wherein the light sensitive product comprises a molecule that is susceptible to photodecomposition.

17. The dropper applicator according to claim 16 wherein the molecule is a photoinitiator.

18. The dropper applicator according to claim 17 wherein the photoinitiator is benzoin, a peroxide, an azo-compound, nitrogen dioxide, or combinations thereof.

19. The dropper applicator according to claim 15 wherein the light sensitive product is activated by a light source having a peak wavelength between 100 nm and 390 nm.

20. The dropper applicator according to claim 19 wherein the light sensitive product is activated by a light source having a peak wavelength between 100 nm and 280 nm.

21. The dropper applicator according to claim 19 wherein the light sensitive product is activated by a light source having a peak wavelength between 280 nm and 315 nm.

22. The dropper applicator according to claim 19 wherein the light sensitive product is activated by a light source having a peak wavelength between 315 nm and 390 nm.

23. The dropper applicator according to claim 15 wherein the light sensitive product is activated by a light source having a peak wavelength between 390 nm and 750 nm.

24. The dropper applicator according to claim 15 wherein the light sensitive product is activated by a light source having a peak wavelength between 750 nm and 1,400 nm.

* * * * *